Z. KUTCHUK.
TIRE.
APPLICATION FILED APR. 3, 1919.
1,351,576.
Patented Aug. 31, 1920.
2 SHEETS—SHEET 1.
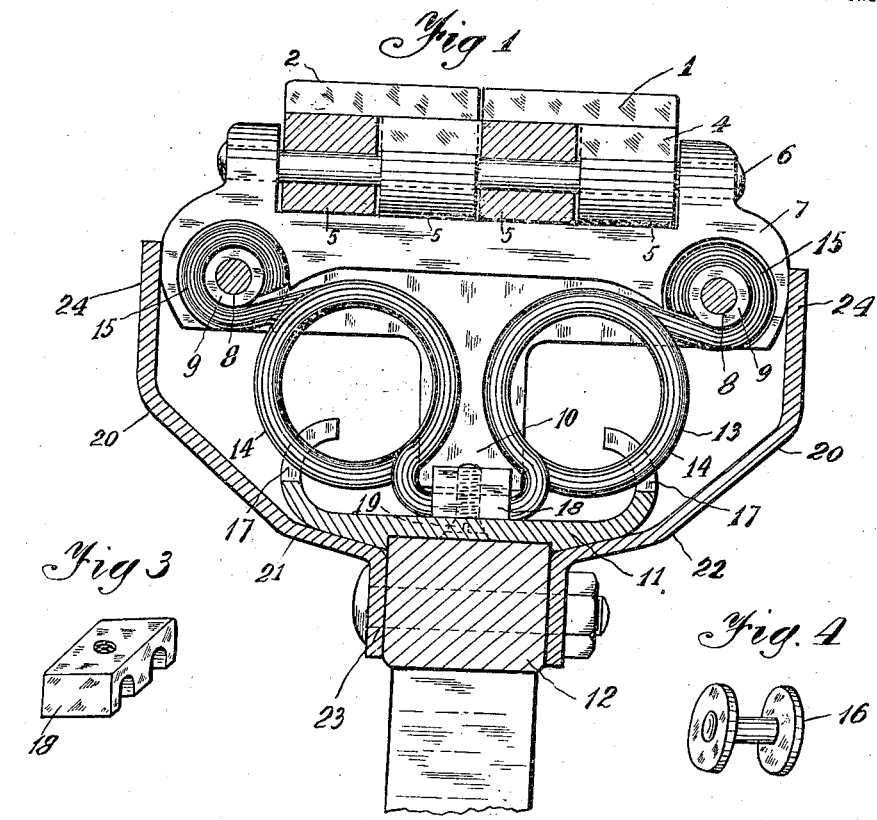
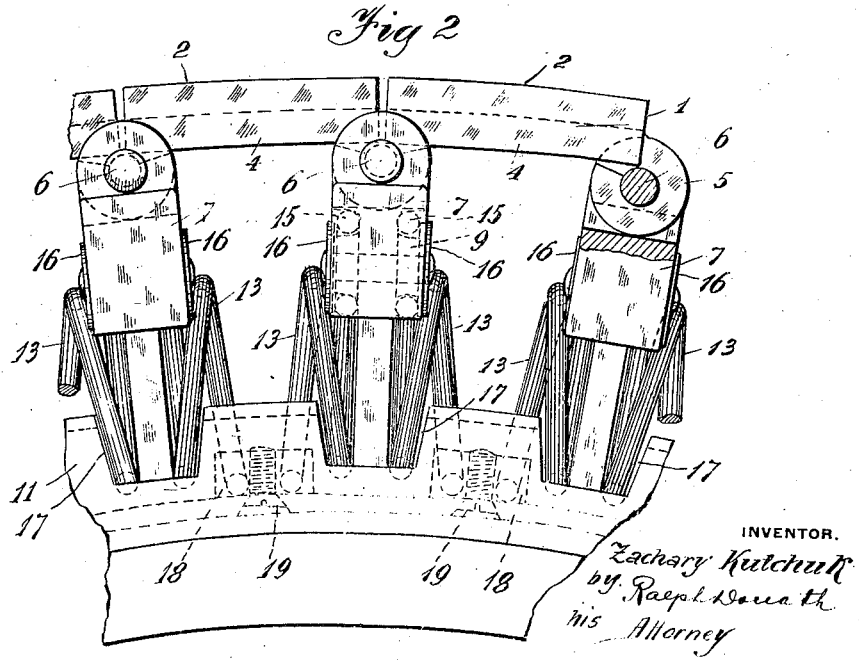
INVENTOR.
Zachary Kutchuk
by Raeph Donath
his Attorney Z. KUTCHUK.
TIRE.
APPLICATION FILED APR. 3, 1919.
1,351,576.
Patented Aug. 31, 1920.
2 SHEETS—SHEET 2.
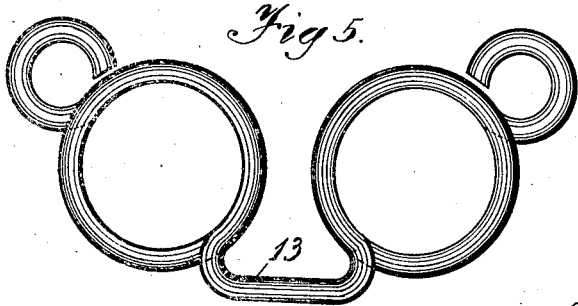
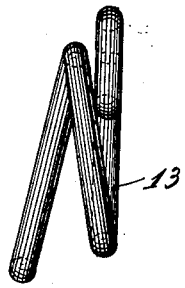
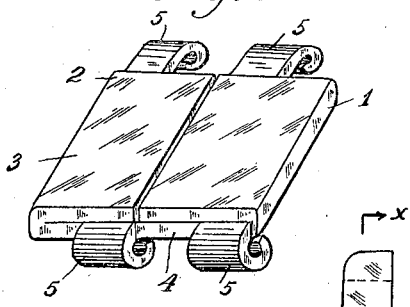
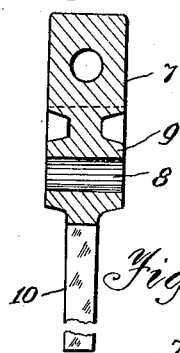
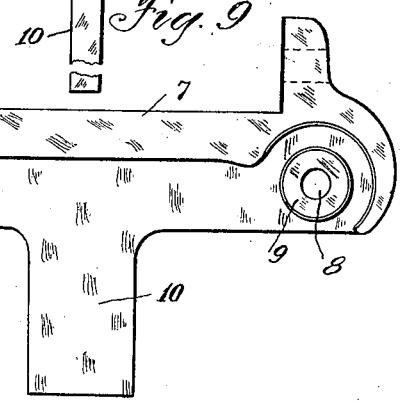
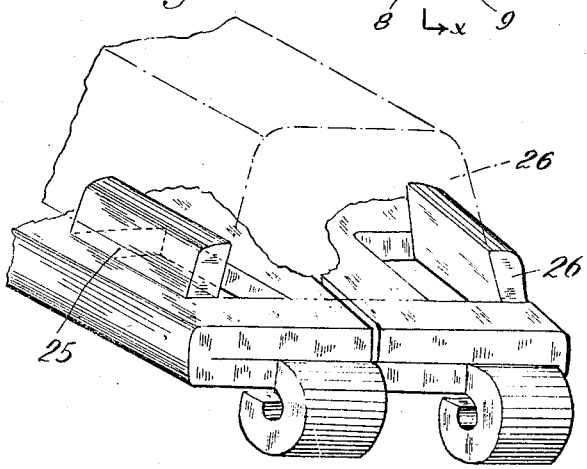
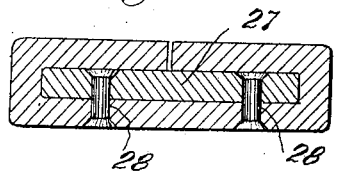
INVENTOR.
Zachary Kutchuk
by Ralph L. Donath
his Attorney

UNITED STATES PATENT OFFICE.

ZACHARY KUTCHUK, OF PITTSBURGH, PENNSYLVANIA.

TIRE.

1,351,576.  Specification of Letters Patent.  Patented Aug. 31, 1920.

Application filed April 3, 1919. Serial No. 287,274.

*To all whom it may concern:*

Be it known that I, ZACHARY KUTCHUK, a citizen of the United States, residing at Pittsburgh, in the county of Allegheny and State of Pennsylvania, have invented certain new and useful Improvements in Tires, of which the following is a specification.

This invention relates to a tire and has for its primary object to provide a resilient tire, the elements of which are so arranged and associated that the use of air is dispensed with.

An object of the invention is to provide a tire of a very substantial construction without the necessity of sacrificing the resiliency thereof.

Another object of the invention is the novel manner of constructing and arranging the springs so that the same will give the maximum amount of resiliency to the tread and in such a manner that the springs will be effectively inclosed so as not to be distorted in the use of the tire.

Besides the above my invention is distinguished in the novel manner of associating the springs with the tread member and the annulus so that the springs cannot be displaced while at the same time giving to the tread member the greatest amount of resiliency.

A feature of my invention is the manner of constructing each bracket so that solid members will come into contact before a spring reaches a collapsing condition.

With these and other objects in view the invention will be better understood from the following detailed description taken in connection with the accompanying drawing wherein:

Figure 1 is a sectional view through the tire rim between the spring members.

Fig. 2 is a side elevation of the tire with parts in section and the casing removed.

Fig. 3 is a perspective view of the clamp.

Fig. 4 is a perspective view of a rivet member.

Fig. 5 is a side elevation of the spring.

Fig. 6 is an end elevation of the spring.

Fig. 7 is a perspective view of one of the tread members.

Fig. 8 is a sectional view of the bracket on line *x—x*, Fig. 9.

Fig. 9 is a side elevation of the bracket.

Fig. 10 is a perspective view of a modification of my invention.

Fig. 11 is a sectional view through a modified form of tread member.

Again referring to the drawing which illustrates one of the many forms in which my invention may be constructed, the numeral 1 designates a tread composed in this particular instance of a plurality of members 2, as clearly shown in Fig. 7, each consisting of sheet metal stamped and bent back upon itself to form a tread portion 3 and a body portion 4, the latter having projecting therefrom ears 5.

It will be noted that the ears 5 are staggered so that the ears of one member may be hinged to the ears of the adjacent member by means of a pin 6 passing through the outwardly extending ears of an adjacent bracket 7. By this arrangement it will be seen that a very flexible tread is provided which will have great durability owing to the fact that the entire tread portions 3 and most of the body portion must become worn out before the tread is rendered useless.

Each bracket 7 is provided with an opening 8 at each end, and each opening is surrounded by a boss 9 at each side of the bracket for a purpose hereinafter described. Each bracket is also provided with an extension 10 arranged and spaced from an annulus 11, a distance great enough that they will come into engagement upon solid means, nearing a collapsing point. The annulus 11, is constructed to encircle the felly 12 of the wheel.

Arranged between each bracket and the annulus are two duplex coil springs 13, the coiled portions 14 of which are arranged at opposite sides of the center of the tire. The ends of these springs are looped and arranged around the bosses 9 as indicated at 15.

Thus it will be seen that the springs are connected directly to the bracket and for the purpose of preventing dislocation of the springs from the bosses, I provide rivet members 16 as shown in Fig. 4 for clamping the ends of the springs to the bosses. The coiled portions are also arranged in slots 17 formed in the annulus so that the coiled portions will be held against displacement. Each coil spring is further clamped to the annulus by means of a clamp 18 that engages the intermediate portions of two adjacent springs and is fastened to the annulus in any suitable manner, such as by a screw 19.

To complete the invention I provide a casing 20, consisting of two side members 21 and 22 bolted to the felly 12 as indicated at 23. These side members are provided with a radially extended portion 24 slidably receiving the brackets so that the latter will be limited to movement substantially radially of the wheel. In some cases it may be advisable to provide a rubber tread and if this is the case, the tread portion of each member may be provided with outstruck tongues 25, adapted to grip the rubber tread 26.

In Fig. 11, I have shown the tread member of three thicknesses of material by providing an extra strip 27 riveted to the body by means of rivets 28.

From the foregoing description taken in connection with the accompanying drawings it should be apparent that I provide a tire of substantial construction having the required resiliency in which all parts coöperate to withstand excessive strains and properly housing the resilient elements against distortion. It is of course to be understood that the parts may be constructed in various other manners than shown and the parts associated differently so therefore I do not desire to be limited in any manner except as set forth in the claims hereunto appended.

Having described my invention, what I claim is:

1. In combination, a flexible tread, brackets extending transversely of the tread and hinged thereto, an annulus, resilient members connecting said brackets and the annulus, and means carried by the brackets and coöperating with the annulus for positively limiting movement of the brackets toward said annulus.

2. In combination, a flexible tread, brackets connected thereto and each having an inwardly projecting extension, an annulus, and resilient members connecting said brackets and the annulus.

3. In combination, a flexible tread, brackets extending transversely of the tread and connected thereto, an annulus, and coil springs of duplex type secured at their intermediate portions to the annulus and at their ends to the brackets adjacent the ends thereof.

4. In combination, a flexible tread, brackets extending transversely of the tread and connected thereto, and pairs of coil springs of duplex type positioned adjacent the opposite sides of the respective brackets, said springs being secured at their intermediate portions to the annulus and at their ends to the brackets.

In testimony whereof I affix my signature in the presence of two witnesses.

ZACHARY KUTCHUK.

Witnesses:
 MARY DONATH,
 PAUL PURCHARD.